US006711651B1

(12) United States Patent
Moreno et al.

(10) Patent No.: US 6,711,651 B1
(45) Date of Patent: Mar. 23, 2004

(54) METHOD AND APPARATUS FOR HISTORY-BASED MOVEMENT OF SHARED-DATA IN COHERENT CACHE MEMORIES OF A MULTIPROCESSOR SYSTEM USING PUSH PREFETCHING

(75) Inventors: Jaime H. Moreno, Hartsdale, NY (US); Jude A. Rivers, Peekskill, NY (US); John-David Wellman, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 09/655,642

(22) Filed: Sep. 5, 2000

(51) Int. Cl.$^7$ .............................................. G06F 13/00
(52) U.S. Cl. ........................ 711/141; 711/137; 711/144
(58) Field of Search .................................. 711/137, 141, 711/144, 145

(56) References Cited

U.S. PATENT DOCUMENTS

| 5,214,766 | A | * | 5/1993 | Liu .............................. 711/124 |
| 5,829,023 | A | * | 10/1998 | Bishop ........................ 711/118 |
| 6,038,644 | A | * | 3/2000 | Irie et al. ..................... 711/141 |
| 6,065,058 | A | * | 5/2000 | Hailpern et al. ............. 709/231 |
| 6,311,187 | B1 | * | 10/2001 | Jeyaraman .................... 707/10 |

OTHER PUBLICATIONS

Abdel–Shafi et al, "An Evaluation of Fine–Grain Producer Initiated Communication in Cache Coherent Multiprocessors," 1997, Int'l. Sympoon High Performance Computer Architecture, Feb. 1–5, 1997, pp. 204–215.*
Hauswirth et al, "A Component and Communication Model For Push Systems," ACM Sigsoft Software Engineering Notes, vol. 24, No. 6, Nov. 1999, pp. 20–38.*
Koufaty et al, "Data Forwarding In Scalable Shared–Memory Multiprocessors," IEEE Trans. on Parallel and Distributed Sys., vol. 7, No. 12, Dec. 1996, pp. 1250–1264.*
Yoon et al, "COPEN: A CoRbtA–Based Intelligent Push Engine," Proceedings 1998 Asia Pacific Software Engineering Conf., Dec. 2–4, 1998, pp. 330–337.*
Koufaty et al, "Comparing Data Forwarding and Prefetching for Communication–Induced Misses in Shared–Memory MPs," Proceedings of the 12$^{th}$ International Conference on Supercomputing, 1998, pp. 53–60.*
Hill et al., "Using Prediction to Accelerate Coherence Protocols", Proceedings of the 25$^{th}$ Annual International Symposium on Computer Architecture (ISCA), Barcelona, Spain, Jun. 27 through Jul. 2, 1998, pp. 179–190.
Falsafi et al., "Memory Sharing Predictor: The Key to a Speculative Coherent DSM", Proceedings of the 26$^{th}$ International Symposium Computer Architecture (ISCA), Atlanta, GA, May 2–4, 1999, pp. 172–183.

* cited by examiner

Primary Examiner—Glenn Gossage
(74) Attorney, Agent, or Firm—F. Chau & Associates, LLC

(57) ABSTRACT

A method and apparatus are provided for moving at least one of instructions and operand data throughout a plurality of caches included in a multiprocessor computer system, wherein each of the plurality of caches is included in one of a plurality of processing nodes of the system so as to provide history-based movement of shared-data in coherent cache memories. A plurality of entries are stored in a consume after produce (CAP) table attached to each of the plurality of caches. Each of the entries is associated with a plurality of storage elements in one of the plurality of caches and includes information of prior usage of the plurality of storage elements by each of the plurality of processing nodes. Upon a miss by a processing node to a cache included therein, any storage elements that caused the miss are transferred to the cache from one of main memory and another cache. An entry is created in the table that is associated with the storage elements that caused the miss. A push prefetching engine may be used to create the entry.

22 Claims, 4 Drawing Sheets

| Index (D) | Proc | Count | Pattern | Count | Pattern | Count | Pattern | Count | Pattern |
|---|---|---|---|---|---|---|---|---|---|
| 16 | 0 | 1 | 01236789ab | 3 | 01234678ab | 30 | 0123456789ab | | |
| 152 | 0 | 1 | | 111 | 0 | | | | |
| 153 | 1 | 3 | | 68 | 1 | | | | |
| 154 | 2 | 2 | | 124 | 2 | | | | |
| 155 | 3 | 1 | | 49 | 3 | | | | |
| 156 | 4 | 95 | 4 | | | | | | |
| 157 | 5 | 3 | | 22 | 5 | | | | |
| 162 | a | 2 | | 69 | a | | | | |
| 163 | b | 1 | | 149 | b | | | | |
| 209 | 0 | 1 | 1 | 60 | 5 | 3 | 123456789ab | 195 | 0123456789ab |
| | 1 | 1 | 7 | 2 | 01234567ab | 1 | 12345678ab | 180 | 0123456789ab |
| | 2 | 1 | 2467ab | 1 | 12345678ab | 4 | 12345678ab | 1 | 123456789ab |
| | 3 | 1 | 23467ab | 1 | 234567ab | 1 | 12345678ab | 8 | 12345678ab |
| | 4 | 1 | 2467ab | 4 | 23467ab | 257 | 0123456789ab | | |
| | 5 | 1 | 234567ab | 1 | 2467ab | 2 | 12345678ab | 2 | 123456789ab |
| | 6 | 1 | 67b | 1 | 2467ab | 1 | 2345678ab | 1 | 12345678ab |
| | 7 | 4 | 67 | 5 | 267ab | 186 | 0123456789ab | | |
| | 8 | 1 | 12345678ab | 136 | 123456789ab | 173 | 0123456789ab | 184 | 0123456789ab |
| | 9 | 1 | 123456789ab | 1 | 0123456789ab | 3 | 12345678ab | | |
| | a | 1 | 67ab | 1 | 123456789ab | 42 | 0123578ab | | |
| | b | 1 | 67ab | 1 | 234567ab | 1 | 01235678a | | |
| 210 | 0 | 2 | 0 | 2 | 03 | 1 | 01235678ab | 9 | 0123456789ab |
| 297 | 0 | 1 | 01235678a | 1 | 01235678a | 1 | 01235678ab | 256 | 0123456789ab |
| | 1 | 1 | 01258a | 1 | 0123578a | 496 | 0123456789ab | 319 | 0123456789ab |
| | 2 | 2 | 01258a | 2 | 012358a | | | | |
| | 3 | 1 | 01258a | 1 | 01234567ab | | | | |
| | 4 | 1 | 01235678ab | 331 | 0123456789ab | 542 | 0123456789ab | | |
| | 5 | 5 | 01234567ab | | | 289 | 0123456789ab | | |
| | 6 | 2 | 01258a | 1 | 01235678a | 495 | 0123456789ab | | |
| | 7 | 2 | 01235678a | 2 | 01234578ab | 273 | 0123456789ab | | |
| | 8 | 1 | 0123578a | 1 | 01235678ab | | | | |
| | | | 0 | 1 | 01258a | | | | |

FIG. 1

METHOD AND APPARATUS FOR HISTORY-BASED MOVEMENT OF SHARED-DATA IN COHERENT CACHE MEMORIES OF A MULTIPROCESSOR SYSTEM USING PUSH PREFETCHING

BACKGROUND

1. Technical Field

The present invention relates generally to memories in computer processing systems and, in particular, to a method and apparatus for history-based movement of shared-data in coherent cache memories.

2. Background Description

With respect to prefetching in coherent cache memories, the prior art corresponding thereto uses history information to help prefetch invalidated cache lines in a node/processor before the invalidated cache lines are used again. For example, the Cosmos "coherence message predictor" and the "memory sharing predictor", predict the source and type of coherence messages for a cache line in a multiprocessor (MP) computer system using a complex prediction logic. The Cosmos coherence message predictor is described by Hill et al., in "Using Prediction to Accelerate Coherence Protocols", Proceedings of the 25th Annual International Symposium on Computer Architecture (ISCA), Barcelona, Spain, June 27 through Jul. 2, 1998, pp. 179–90. The memory sharing predictor is described by Falsafi et. al, in "Memory Sharing Predictor: The Key to a Speculative Coherent DSM", Proceedings of the 26th International Symposium Computer. Architecture (ISCA), Atlanta, Ga., May 2–4, 1999, pp. 172–83.

The goal of the two preceding predictors is to predict incoming messages that affect memory blocks and to timely execute the incoming messages. Thus, the two approaches are basically similar in that they are both based on the ability to predict likely messages in sequence and speculatively execute the messages. However, the two approaches suffer from a long learning overhead which is required to accurately predict "follow-on" messages.

Accordingly, it would be desirable and highly advantageous to have a method and apparatus for moving data in coherent cache memories which does not suffer from a long learning time overhead and yet can still predict necessary data movements and move such data to other processors early enough to avoid long latency cache misses and excessive coherence traffic.

SUMMARY OF THE INVENTION

The problems stated above, as well as other related problems of the prior art, are solved by the present invention, a method and apparatus for history-based movement of shared-data in coherent cache memories.

The invention reduces data misses and access latencies in coherent cache memories in a multiprocessor (MP) computer system. The invention employs mechanisms for causing the pushing of data from one node/processor to other nodes/processors in an MP computer system based on memory sharing patterns. The concept is to monitor and keep a history of which processors in the system consume a particular datum or data (hereinafter "data") that is produced by another node/processor, and push the produced data (e.g., cache line(s)) to the consuming nodes/processors. Cache lines may be pushed from one cache to one or more other caches at other nodes/processors. Thus, the invention can reduce the latency associated with lateral interventions.

In contrast to the prior art, the invention is not concerned with the sequence in which messages arrive, and does not affect the way messages get executed. The invention simply identifies nodes/processors that are likely to use newly produced data, and attempts to timely move copies of the data closer to the consuming nodes/processors to reduce possible cache misses that must be intervened by other nodes/processors in the system. The invention uses a simple history gathering technique, and does not require a complex prediction mechanism to predict likely messages that must follow in series. The invention employs a data-centric approach that actively and aggressively moves data closer to the consuming processor(s), and incurs only a minimal learning overhead, in contrast to the prior art.

According to a first aspect of the invention, there is provided a method for moving at least one of instructions and operand data throughout a plurality of caches included in a computer system, wherein each of the plurality of caches is included in one of a plurality of processing nodes of the system. The method includes the step of storing a plurality of entries in a table attached to each of the plurality of caches, wherein each of the entries is associated with a plurality of storage elements in one of the plurality of caches and includes information of prior usage of the plurality of storage elements by each of the plurality of processing nodes.

According to a second aspect of the invention, there is provided a method for moving at least one of instructions and operand data throughout a plurality of caches included in a computer system, wherein each of the plurality of caches is included in one of a plurality of processing nodes of the system. The method includes the step of storing a plurality of entries in a table attached to each of the plurality of caches, wherein each of the entries is associated with a plurality of storage elements in one of the plurality of caches and includes information of prior usage of the plurality of storage elements by each of the plurality of processing nodes. Upon a miss by a given processing node to a given cache included therein, any given storage elements that caused the miss are transferred to the given cache from one of main memory and another cache. A given entry that is associated with the given storage elements is created in the table.

According to a third aspect of the invention, the method further includes the step of displacing at least one existing storage element in the given cache to make room for the given storage elements.

According to a fourth aspect of the invention, the method further includes the step invalidating an entry associated with the displaced at least one existing storage element, if the entry exists.

According to a fifth aspect of the invention, upon a processing node performing a store operation that updates at least one storage element in a cache included in the processing node, the method further includes the step of searching the table for an entry associated with the at least one storage element. If the entry is found, the at least one storage element is requested to be transmitted to any processing nodes identified in the entry based upon the information stored in the entry.

According to a sixth aspect of the invention, upon a request by a processing node for a storage element in a cache included in another processing node, the method further includes the step of searching the table for an entry corresponding to the requested storage element. If the entry is found, the information stored in the entry is updated to indicate that the requested storage element has been sent to the other processing node. If the entry is not found, a new entry is created in the table for the requested storage element.

According to a seventh aspect of the invention, the creating step includes the step of identifying a usage of the requested storage element by the other processing node.

According to an eighth aspect of the invention, upon a receipt of a storage element by a processing node from another processing node that recently updated the storage element, the method further includes the step of determining whether the received storage element is to be stored in the cache included in the processing node, based upon a current content of the cache.

These and other aspects, features and advantages of the present invention will become apparent from the following detailed description of preferred embodiments, which is to be read in connection with the accompanying drawings.

BRIEF DESCRIPTION OF THE DRAWINGS

FIG. 1 is a diagram illustrating a snapshot of a multiprocessor bus-based memory address trace grouped into cache lines, according to an illustrative embodiment of the invention;

DETAILED DESCRIPTION OF PREFERRED EMBODIMENTS

Figure 2:
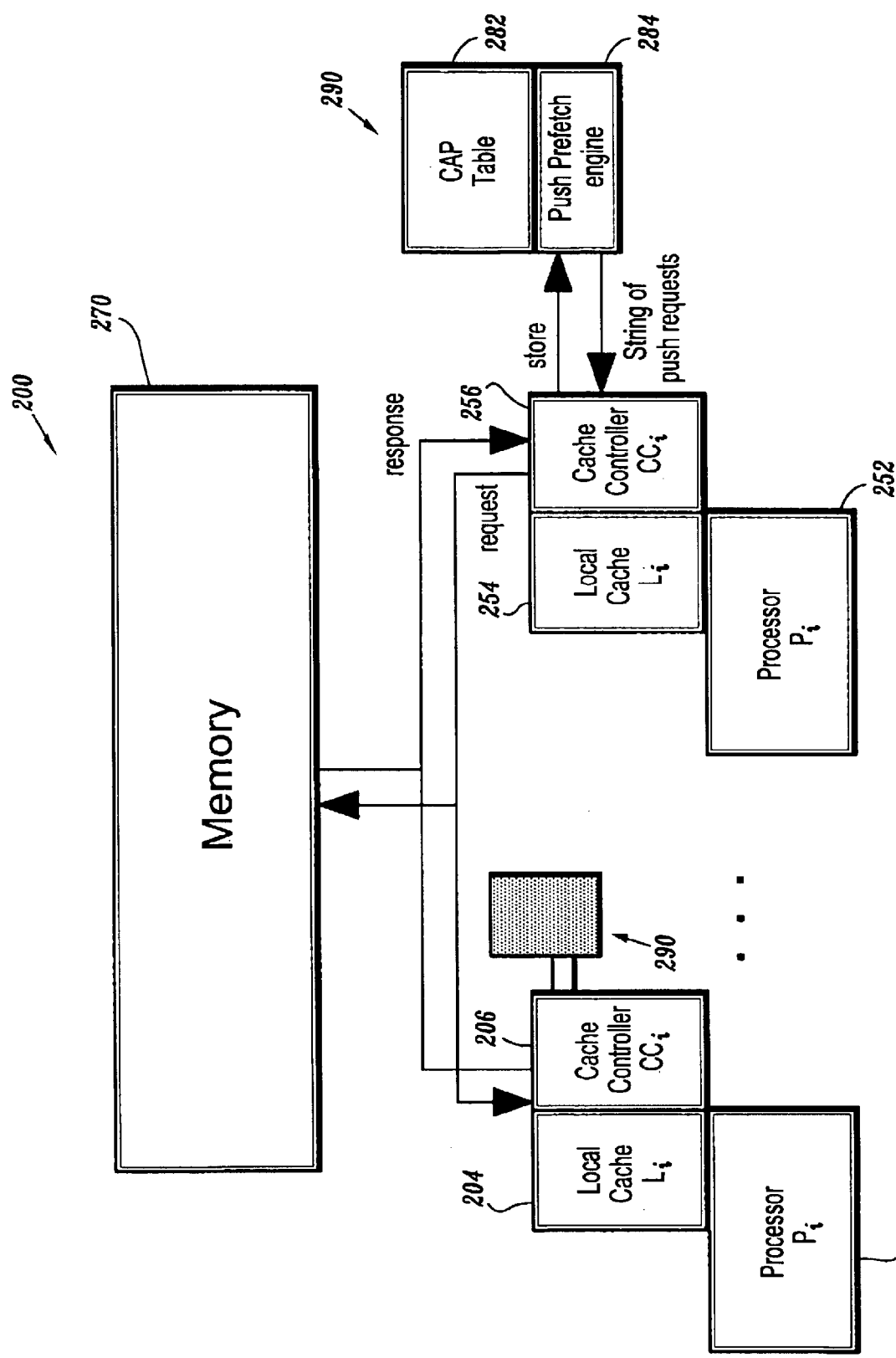
FIG. 2 is a diagram of a multiprocessor (MP) computer system having the mechanisms for implementing history-based movement of shared data, according to an illustrative embodiment of the invention.

The present invention is directed to a method and apparatus for history-based movement of shared-data in coherent cache memories. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPUs), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 4.

The invention reduces the data/instruction access latency in modern multiprocessor (MP) computer systems. Moreover, the invention leverages the inherent producer/consumer memory sharing patterns among nodes/processors running parallel workloads. According to the invention, the memory space is logically divided into contiguous blocks for which this producer/consumer information will be kept. Typically, this division of memory will correspond to the lines or blocks of a cache, and, thus, all such memory blocks are referred to herein as "cache lines".

For each cache line that is written, the writing processor creates and maintains a "consume after produce" (CAP) entry at its coherent cache controller (where the various nodes or processors communicate via shared memory). This CAP entry records the set of other nodes/processors within the system that access the corresponding cache line after it is written by the producing node/processor, and before a subsequent processor writes to the same cache line.

Once a CAP entry has been established, the CAP entry is used to predict the consumers of future writes. When a processor writes to a cache line, the CAP entry for that block is examined (if one exists). Once the storing of data to that cache block is completed, the cache block is pushed to the nodes/processors on the CAP list. The pushing of the cache block is a transaction, where the data is sent to the expected consumers as if they had executed a prefetch for that cache block. The number of nodes/processors to which the block is scheduled to be sent depends on the bit pattern of the CAP entry, which records the prior consumers of that block.

FIG. 1 is a diagram illustrating a snapshot of a multiprocessor bus-based memory address trace grouped into cache lines, according to an illustrative embodiment of the invention. FIG. 1 serves as a strong basis for the invention, especially for the use of CAP entries to determine the unique nodes/processors to which a written cache block data should be pushed. For each cache line (denoted by a unique index), the table indicates the set of processors that write the cache line (the producers) by processor number (in the "Proc" column). The following columns indicate the number of occurrences of each subsequent pattern of consumers of the cache line after the cache line was written by that processor (in "Count" and "Pattern" pairs). In the example of FIG. 1, the cache line size is fixed at 4KB, and there are 12 processors in the system.

In this illustrative example, cache block #16 was stored (written) to 34 times by processor 0 and there were three distinct patterns of consumers between those writes. There are 30 occurrences of the pattern where every processor in the system consumed the data produced by producer 0. There are 3 occurrences of the pattern where every processor except processor 5 consumed the data. There is only 1 occurrence of the pattern where every processor except processors 4 and 5 consumed the data. Thus, there are 3 distinct CAP patterns for block #16 on processor 0. However, the mechanism for generating a CAP entry unifies these patterns into a single pattern that subsumes the constituent patterns by continuously updating consumer information of written data. This allows the use of a single CAP entry per cache block, and avoids difficulties in deciding between sets of CAP patterns. Furthermore, because the push semantics are similar to those of a prefetch (i.e., a processor to which the data is pushed can ignore the push, or save the pushed data in a specialized prefetch buffer), the cost of executing extra pushes is memory bus traffic.

FIG. 2 is a diagram of a multiprocessor (MP) computer system 200 having the mechanisms for implementing history-based movement of shared data, according to an illustrative embodiment of the invention. In the multiprocessor system 200, each of the various nodes/processors (e.g., Pi 202, Pj 252) has its own local cache memory (e.g., Li 204, Lj 254, respectively) which interfaces with that of other nodes/processors and the main memory 270 through an intervening medium (e.g., a bus, a ring, and so forth). In the example of FIG. 2, the intervening network is illustrated by request and response lines. Blocks CCi 206 and CCj 256 represent the cache controllers for the Li 204 and Lj 254 local caches, respectively. For illustrative purposes, the invention is described in detail with respect to processor Pj 252 and its accompanying cache Lj 254 and coherent cache controller CCj 256.

The invention employs a CAP table 282 and a push prefetching engine 284 (also collectively referred to herein as CAP engine 290) at the coherent cache controller CCj 256 of processor Pj. The CAP table 282 is effectively a cache of CAP entries, where each CAP entry corresponds to a specific cache block, and records the set of nodes/processors that consume the data produced by the current node/processor in that cache block. The structure of the CAP table 282 needs to be large enough to ensure history availability while still being small enough to be relatively insignificant in terms of the overall local cache (e.g., local cache Lj 254) space. The most basic form of a CAP entry is simply a bit vector that associates a bit with each processor in the multiprocessor system. For the CAP entries of FIG. 1, this would mean that a 12-bit CAP entry is used for each cache block to represent the 12 processors that can potentially consume data written into each of the blocks. Of course, the preceding example is merely illustrative for in very large computer systems it may be impractical to include a node in the CAP, since, every processor in the system. Thus, CAP entries could be used to denote groups of processors (e.g. multiprocessor nodes, or other more arbitrary divisions of the processors into groups). Given the teachings of the invention provided herein, one of ordinary skill in the related art will readily contemplate a proper size for the. CAP table structure given the computer processing system in which the invention is to be implemented, as well as various ways in which to represent a CAP entry, all while maintaining the spirit and scope of the invention.

In an optimized embodiment of the invention, a processor or node can be represented in a CAP entry by more than one bit. The additional bit (s) may be used to provide information regarding the cache block usage patterns and coherence activities at the consuming node/processor. For example, if the consuming processor or node of a cache line always consumes and writes immediately, thereby requesting the block in an exclusive mode, then the consuming processor or node will speed up processing to provide the data to the requesting processor in exclusive mode. An additional bit representation could therefore indicate whether the data is needed in shared or exclusive mode by the consuming processor. Given the teachings of the invention provided herein, one of ordinary skill in the related art will contemplate these and various other multi-bit implementations for gathering and/or representing the CAP data, while maintaining the spirit and scope of the invention.

According to an illustrative embodiment of the invention, data pushing employs two distinct actions. First, to update the CAP entries, the push prefetching engine 284 should be able to detect requests by other processors for a given memory block. Second, to know when to push a cache block to those processors identified in a CAP entry, the cache controller CCj 256 of the processor Pj 256 must notify the push prefetching 284 engine when the cache controller CCj 256 does a store operation and to which cache block address.

The push prefetching engine 284 should be aware of memory access requests in the system 200. Generally, when a processor writes a memory location, the processor first needs to acquire exclusive access to that memory block. While the processor holds exclusive access, no other processor may have a valid copy of the data. When another processor makes the first subsequent request to acquire a copy of the data, the processor that wrote the memory block must give up its exclusivity. Hence, the processor that wrote a memory block must be notified that some other processor has requested the data. According to the illustrative embodiment of the invention, the processor must be notified not only hat some other processor has requested the data but also which processor made the request. Similarly, all processors need to be aware of all (shared memory) data access requests by all other processors. In a multiprocessor system, the cache controller can simply send the relevant information (i.e. the memory block address being read and the processor doing the reading) to the push prefetching engine 284. For each such request, the push prefetching engine 284 would access the CAP table 282 to see whether the requested memory block has a corresponding CAP entry in the CAP table 282 and, if so, then set the bit corresponding to the requesting processor.

Given that the traditional memory block request snooping mechanism (as described above) can be leveraged to allow the push prefetching engine 284 to update the CAP entries, the remaining consideration corresponds to when the push prefetching engine is triggered to generate the memory block data pushes. The mechanism to trigger data pushing can be invoked through the detection of a completed store operation to a given memory block. However, it may be difficult to determine when a store operation to a memory block has completed, since many individual stores can be made to a given memory block while it is held exclusively by a processor and before any other processor requests the data.

For example, for the 4KB blocks of FIG. 1, a processor could acquire exclusive access to the memory block, conduct one thousand separate stores to various bytes of the memory block, and only after the last of these stores would any other processor request the data (or a portion thereof) in the memory block. While the push prefetching engine 284 could push the data after each separate store operation, this would result in one thousand times more push traffic than necessary, which would result in an undesirable increase in the multiprocessor communication traffic. Hence the push prefetching engine 284 should attempt to determine when a full set of stores to a given memory block has completed before pushing the data to other processors. Detecting the completion of a memory block write can be implemented using several different methods. However, according to a preferred embodiment of the invention, a unified detection of store completion mechanism is adopted herein by combining a conservative approach with a somewhat more aggressive approach in an attempt to balance the reduction in memory bus traffic and the reduction in other processor demand fetch misses.

One approach is not to generate any data pushes until a request to read the data has been received from another processor, e.g., until a demand fetch is received for a memory block that this processor currently holds in exclusive mode. Once the demand fetch is detected, the demanding processor would be sent the data (via the normal demand fetch serving mechanism of the multiprocessor) and the push prefetching engine 284 would generate a sequence of data push messages to the remaining processors indicated in the CAP entry of the associated memory block. The advantage of this approach is that the write operation of the current processor is guaranteed to be complete when a demand request for that memory block is received. The potential disadvantage, however, is that the data is not pushed until the data is already being requested, so there is less time between the push of the data and use of the data. While this may actually be helpful for many of the processors (e.g. the length of time the pushed data must reside in a prefetch buffer on other processors may be reduced, thereby reducing the pressures on those limited resources), the opportunity to push the data to the first requesting processor has obviously been lost, which means that the first requesting processor must suffer a full-latency access.

A second approach is to leverage the observation that a processor's use of a memory block generally comes in sequential bursts of activity, and thus a sequence of writes to a memory block is likely to be completed when the processor moves out of that memory block and onto another memory block. Consider, for example, the writing of data to a large array (of data); the processor will write data to the first memory block of the array, and proceed to the next memory block, and then subsequent memory blocks. Once the writing of data moves from the first memory block to the next memory block, it is very unlikely that the data in the first memory block will be rewritten before consuming processors access the data of the first memory block. Thus, when the processor moves from writing one memory block to another memory block, the write operation on the first memory block can be assumed to be completed, and the data can be pushed out to the consumer processors listed in the CAP entry.

Hence, the store completion detection mechanism for triggering push prefetching monitors for either: (1) a processor writing to a given memory block moves off the given memory block to perform a write activity on another memory block; or (2) a read request for a memory block currently being held at a given processor in an exclusive mode is received from another processor.

Figure 3:
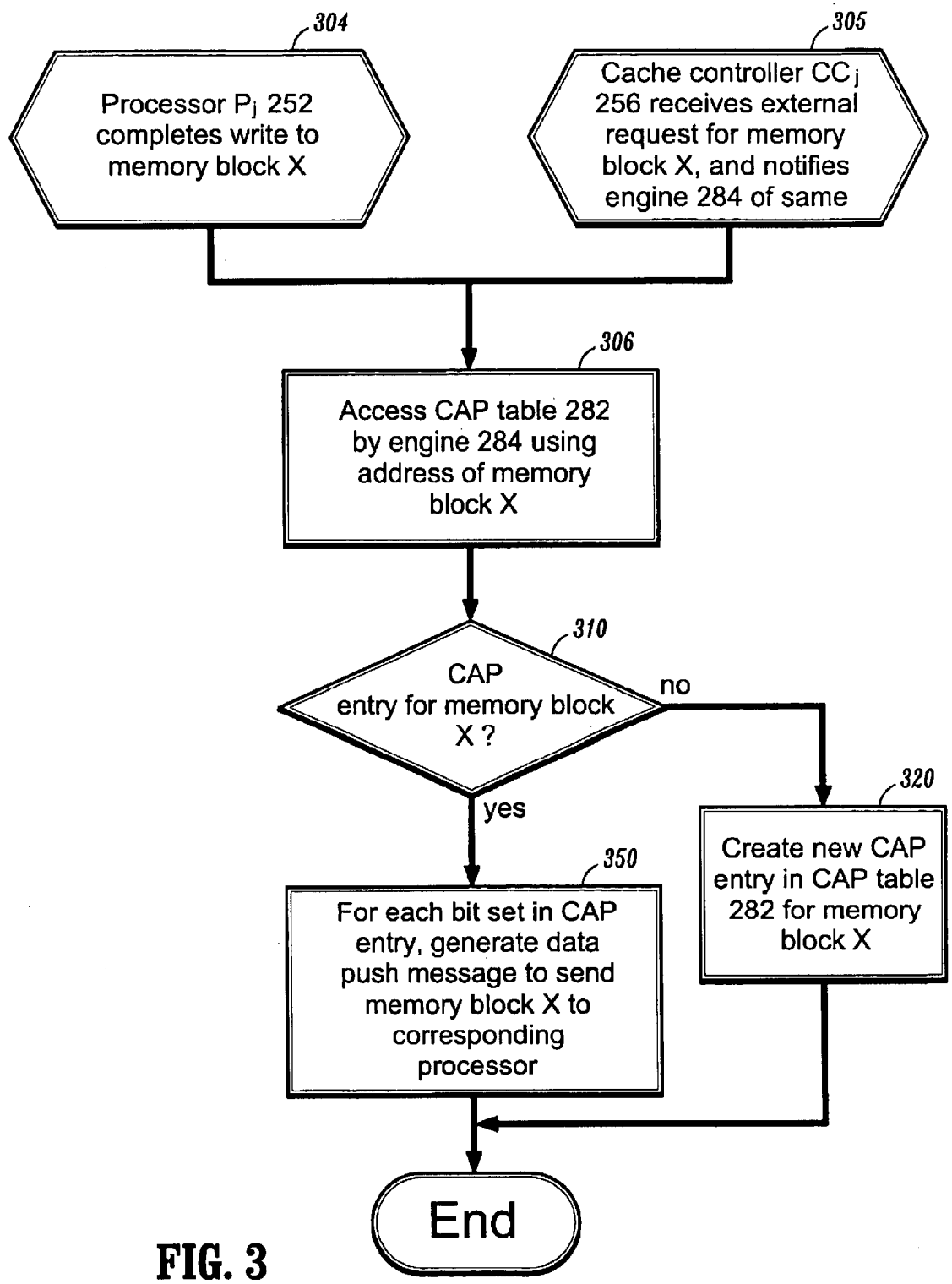
FIG. 3 is a flow diagram illustrating a method for history-based movement of shared-data in coherent cache memories of a multiprocessor computer system, according to an illustrative embodiment of the invention.

FIG. 3 is a flow diagram illustrating a method for history-based movement of shared-data in coherent cache memories of a multiprocessor computer system, according to an illustrative embodiment of the invention.

In the event that processor Pj 252 completes writing to memory block X (304), or that cache controller CCj 256 receives an external request for memory block X (which is held in exclusive mode in processor Pj) and notifies the push prefetching engine 284 of the same (305), the push prefetching engine 284 then accesses the CAP table 282 using the address of memory block X (step 306) and determines whether there is a CAP entry for memory block X therein (step 310). Such an entry would include an encoding of the previous consumers of the data in memory block X. If there is no entry in the CAP table 282 for memory block X, then a new CAP entry is created in the CAP table 282 for memory block X (box 320). In contrast, if there is an entry in the CAP table 282 for memory block X (and the CAP entry is a bit-vector where one bit is associated with each processor of the system), then the push prefetching engine 284 will read out the CAP entry, and for each bit that is set in the CAP entry bit vector, a data push message is generated to send memory block X to the processor associated with that bit (step 350).

In the example of FIG. 1, where a 12-bit bit-vector is used to represent the 12 processors of the system, bit zero would correspond to consumption by processor zero, and if bit zero is set, then a data push message is generated to send the data to processor zero at step 350. As each data push message is generated, the message is forwarded to the cache controller CCj 256, which sends the data out on the multiprocessor communication network to the target processor. The cache controller can filter the stream of data push messages to remove redundant pushes (e.g., to the processor that performed a demand fetch of block X). After all of the data push messages have been generated, the push prefetching engine 284 is considered to have completed the writing of memory block X.

According to an illustrative embodiment of the invention, steps 304 and 305 of FIG. 3 may be implemented as follows. Presume that processor Pj 252 begins writing to memory block X. The cache controller CCj notifies the push prefetching engine 284 that the processor is writing to block X, and makes note of the same. On all subsequent writes to memory block X, the cache controller CCj 256 notifies the push prefetching engine 284. If the processor then moves on to write to memory block Y (which is distinct from X), then the processor again notifies the push prefetching engine 284 that it is writing to a memory block, this time to memory block Y. The push prefetching engine 284 notes that this is a change in the target of the memory block writes and, thus, assumes that the writes to memory block X are complete. Alternatively, if the cache controller CCj 256 receives an external request for any data block, e.g., X in this case, then the cache controller CCj 256 must notify the push prefetching engine 284. Any of these two actions can initiate push prefetching on data block X. Given the teachings of the invention provided herein, one of ordinary skill in the related art will contemplate these and various other implementations of the elements of the invention, while maintaining the spirit and scope thereof.

Figure 4:
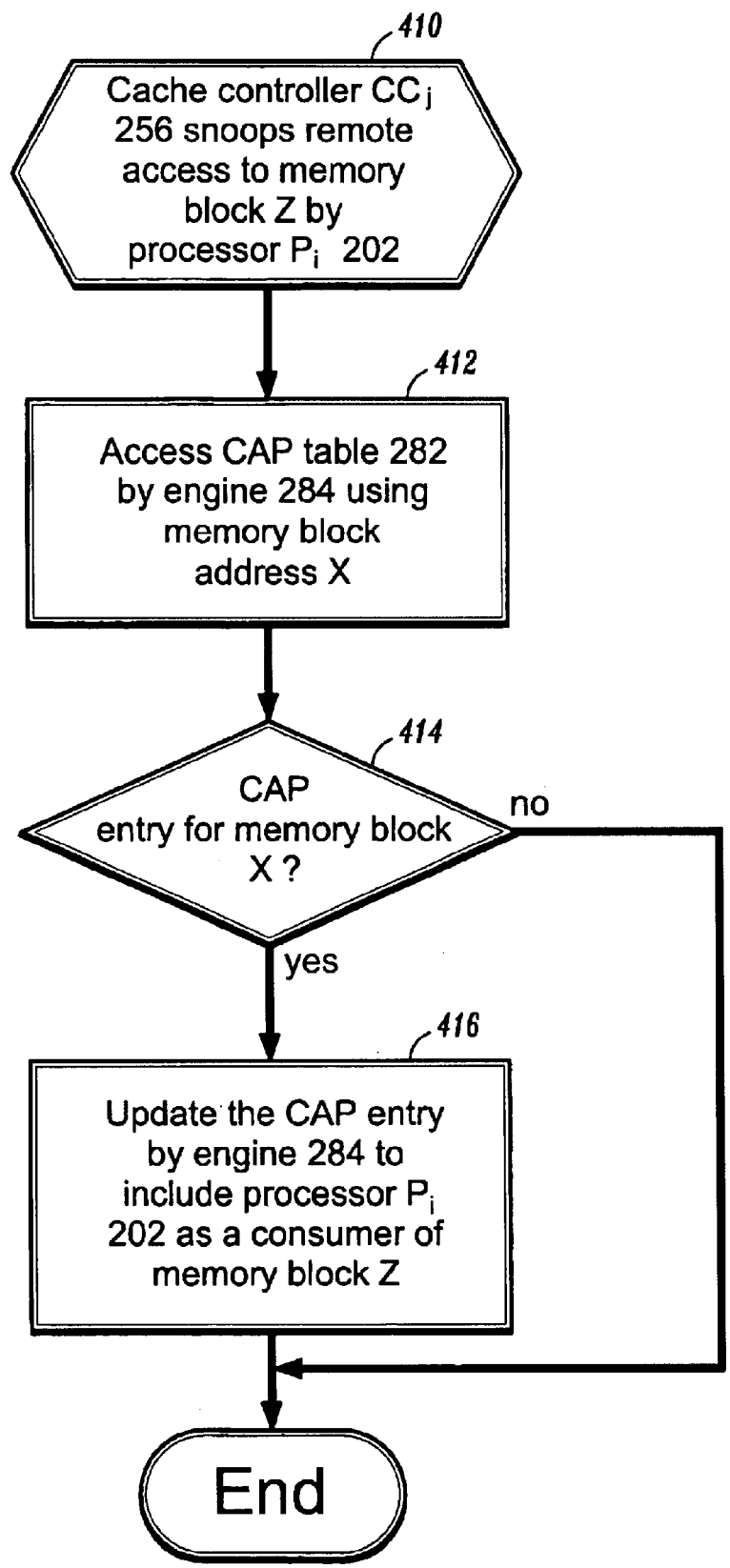
FIG. 4 is a flow diagram illustrating a method for updating the consume after produce (CAP) table with CAP information, according to an illustrative embodiment of the invention.

FIG. 4 is a flow diagram illustrating a method for updating the CAP table 282 with CAP information, according to an illustrative embodiment of the invention. Whenever a memory block request is detected (or snooped) by the cache controller CCj 256, the memory block request information is sent to the push prefetching engine 284. The cache controller CCj 256 can either forward all such snooped requests or filter the requests in an appropriate manner to reduce message traffic, if needed. Consider, for example, that the cache controller CCj 256 snooped a read request (remote access) by processor Pi 252 for some memory block Z (410). The push prefetching engine 284 receives the information that processor Pi 252 requested the data for block Z, and the push prefetching engine 284 accesses the CAP table 282 using the address of memory block Z (step 412) and determines whether there is a CAP entry in the CAP table 282 for memory block Z (step 414). If there is no CAP entry in the CAP table 282 for memory block Z, then the push prefetching engine 284 ignores the read request information, and the method is terminated. In contrast, if there is a CAP entry for memory bloc,k Z then the push prefetching engine 284 updates the CAP entry to include processor Pi 252 as a consumer of memory block Z (step 414), and the method is terminated.

Note that the push prefetching engine 284 is assumed to generate a special category of data communication message, i.e., the data push message. These data push messages operate similar to data prefetch request responses, with at least one distinction being that the processor that receives the data push message never generated a prefetch request. According to the invention, push prefetching is implemented in a system where the multiprocessors and cache controllers are designed using a priority scheduling algorithm or mechanism that helps to ensure that demand requests have preferred priority over prefetch requests or data push messages and, thus, push prefetching should not unduly impact the operation of the demand requests. Further, according to another embodiment of the invention, the data push messages (and any prefetch requests) are received by the target processors into special memories and, thus, need not pollute their caches or overly impact the normal cache behavior. It is to be appreciated that push prefetching does not require any particular implementation of a priority scheduler or of special buffering for data push or prefetch messages; the use of such schemes would, however, generally provide better local processor (and system) performance.

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for maintaining a table for facilitating transfer of at least one of instructions and operand data throughout a plurality of caches in a computer system, wherein each of the plurality of caches is included in one of a plurality of processing nodes of the computer system, said method comprising the step of:

storing a plurality of entries in a table attached to each of the plurality of caches, wherein each of the entries is associated with a plurality of storage elements in one of the plurality of caches and includes information of prior storage of the plurality of storage elements by each of the plurality of processing nodes.

2. A method for moving at least one of instructions and operand data throughout a plurality of caches in a computer system, wherein each of the plurality of caches is included in one of a plurality of processing nodes of the computer system, said method comprising the steps of:

storing a plurality of entries in a table attached to each of the plurality of caches, wherein each of the entries is associated with a plurality of storage elements in one of the plurality of caches and includes information of prior usage of the plurality of storage elements by each of the plurality of processing nodes;

upon a miss by a given processing node to a given cache included therein, transferring any given storage elements that caused the miss to the given cache from one of main memory and another cache; and creating a given entry in the table that is associated with the given storage elements.

3. The method according to claim 2, further comprising the step of displaying at least one existing storage element in the given cache to make room for the given storage elements to be transferred.

4. The method according to claim 3, further comprising the step of invalidating an entry associated with the displaced at least one existing storage element, if that entry exists.

5. The method according to claim 2, further comprising the steps of:

upon a processing node performing a store operation that updates at least one storage element in the cache included in that processing node, searching the table for an entry associated with the at least one storage element; and if such an entry is found, requesting transmission of the at least one storage element to any processing nodes identified in that entry based upon the information stored in that entry.

6. The method according to claim 2, further comprising the steps of:

upon a request by a processing node for a storage element in cache included in another processing node, searching the table for an entry corresponding to the requested storage element;

if such an entry is found, updating the information stored in that entry to indicate that the requested storage element has been sent to the another processing node; and if such an entry is not found, creating a new entry in the table for the requested storage element.

7. The method according to claim 6, wherein said creating step comprises the step of identifying a usage of the requested storage element by the another processing node.

8. The method according to claim 2, further comprising the step of:

upon a receipt of a storage element by a processing node from another processing node that recently updated the received storage element, determining whether the received storage element is to be stored in the cache included in the processing node receiving the storage element, based upon a current content of that cache.

9. An apparatus for moving at least one of instructions and operand data throughout a plurality of caches in a computer system, wherein each of the plurality of caches is included in one of a plurality of processing nodes of the computer system, said apparatus comprising:

a table of entries attached to each of the plurality of caches, wherein each entry is associated with a plurality of storage elements in one of the plurality of caches and includes information of prior usage of the plurality of storage elements by each of the plurality of processing nodes, and wherein each of the plurality of processing nodes is adapted to transfer any given storage elements that caused a miss to a cache included therein from one of main memory and another cache; and an engine adapted to create a given entry in the table that is associated with the given storage elements that caused the miss.

10. The apparatus according to claim 9, further comprising a plurality of cache controllers, wherein each of the plurality of cache controllers is associated with one of the plurality of caches and is adapted to displace at least one existing storage element in the cache associated therewith to make room for any storage elements to be transferred into the associated cache.

11. The apparatus according to claim 10, wherein each of the plurality of cache controllers is further adapted to invalidate an entry associated with the displaced at least one existing storage element, if that entry exists.

12. The apparatus according to claim 9, wherein the engine is further adapted to search the table for an entry associated with at least one storage element that has been updated by a store operation, and wherein the apparatus further comprises:
a plurality of cache controllers, wherein each of the plurality of cache controllers is associated with one of the plurality of caches and is adapted to request transmission of the at least one storage element to any processing node identified in that entry based upon the information stored in that entry, if such an entry is found.

13. The apparatus according to claim 9, wherein the engine is further adapted to search the table for an entry associated with a storage element that is requested from a cache in another processing node, update the information stored in that entry to indicate that the requested storage element has been sent to the another processing node if such an entry is found, and create a new entry in the table for the requested storage element if such an entry is not found.

14. The apparatus according to claim 13, wherein the engine is further adapted to identify a usage of the requested storage element by the another processing node.

15. The apparatus according to claim 9, further comprising a plurality of cache controllers, wherein each of the plurality of cache controllers is associated with one of the plurality of caches and is adapted to determine whether a recently updated storage element received by a first processing node from a second processing node is to be saved in the cache included in the first processing node, based upon a current content of the cache included in the first processing node.

16. A program storage device readable by machine, tangibly embodying a program of instructions executable by the machine to perform method steps for moving at least one of instructions and operand data throughout a plurality of caches in a computer system, wherein each of the plurality of caches is included in one of a plurality of processing nodes of the computer system, said method steps comprising:
storing a plurality of entries in a table attached to each of the plurality of caches, wherein each of the entries is associated with a plurality of storage elements in one of the plurality of caches and includes information of prior usage of the plurality of storage elements by each of the plurality of processing nodes;
upon a miss by a given processing node to a given cache included therein,
transferring any given storage elements that caused the miss to the given cache from one of main memory and another cache; and
creating a given entry in the table that is associated with the given storage elements.

17. The program storage device according to claim 16, said program of instructions further including instructions executable by the machine to perform a step of displaying at least one existing storage element in the given cache to make room for the given storage elements to be transferred.

18. The program storage device according to claim 17, said program of instructions further including instructions executable by the machine to perform a step of invalidating an entry associated with the displaced at least one existing storage element, if that entry exists.

19. The program storage device according to claim 16, said program of instructions further including instructions executable by the machine to perform the steps of:
upon a processing node performing a store operation that updates at least one storage element in the cache included in that processing node,
searching the table for an entry associated with the at least one storage element; and
if such an entry is found, requesting transmission of the at least one storage element to any processing nodes identified in that entry based upon the information stored in that entry.

20. The program storage device according to claim 16, said program of instructions further including instructions executable by the machine to perform the steps of:
upon a request by a processing node for a storage element in cache included in another processing node,
searching the table for an entry corresponding to the requested storage element;
if such an entry is found, updating the information stored in that entry to indicate that the requested storage element has been sent to the another processing node; and
if such an entry is not found, creating a new entry in the table for the requested storage element.

21. The program storage device according to claim 20, wherein said creating step comprises a step of identifying a usage of the requested storage element by the other processing node.

22. The program storage device according to claim 16, said program of instructions further including instructions executable by the machine to perform the step of:
upon a receipt of a storage element by a processing node from another processing node that recently updated the received storage element,
determining whether the received storage element is to be stored in the cache included in the processing node receiving the storage element, based upon a current content of that cache.

* * * * *